United States Patent [19]

Ferraro

[11] 3,825,018

[45] July 23, 1974

[54] VINER

[75] Inventor: Dominic Ferraro, Walla Walla, Wash.

[73] Assignee: Chisholm-Ryder Company, Inc., Niagara Falls, N.Y.

[22] Filed: Nov. 22, 1972

[21] Appl. No.: 308,675

[52] U.S. Cl. .............................. 130/30 H, 209/390
[51] Int. Cl. ............................................. A01f 12/44
[58] Field of Search......... 130/30 R, 30 H; 209/390, 209/389, 386, 385

[56] References Cited
UNITED STATES PATENTS

| | | | |
|---|---|---|---|
| 2,245,650 | 6/1941 | Christopherson | 209/390 |
| 2,309,630 | 2/1943 | DeBack | 130/30 H |
| 2,768,628 | 10/1956 | Hermanson | 130/30 H |

*Primary Examiner*—Antonio F. Guida
*Attorney, Agent, or Firm*—Joseph P. Gastel

[57] ABSTRACT

A viner for separating a crop, such as peas, from the remainder of the plant including the vines and the pods comprising a frame, an elongated generally cylindrical hollow reel having a surface with apertures therein for permitting said crop to pass therethrough while retaining debris consisting of the remainder of said plant within said reel, means for mounting said reel for rotation about a generally horizontal axis, beater means within said reel for separating said crop from said remainder of said plant, and a reel cleaner for removing said debris from engagement with the inside of the surface of the reel, said reel cleaner including an elongated substantially cylindrical brush having an axis substantially parallel to the axis of said reel and located outside of said reel, flexible bristles on said brush extending toward said surface of said reel and being of a length to penetrate said apertures an amount necessary to force debris away from obstructing relationship with said apertures, and bearings for journalling said brush for idle rotation which is effected by the ends of said bristles being in intermeshing contact with said apertures in the surface of said reel.

12 Claims, 12 Drawing Figures

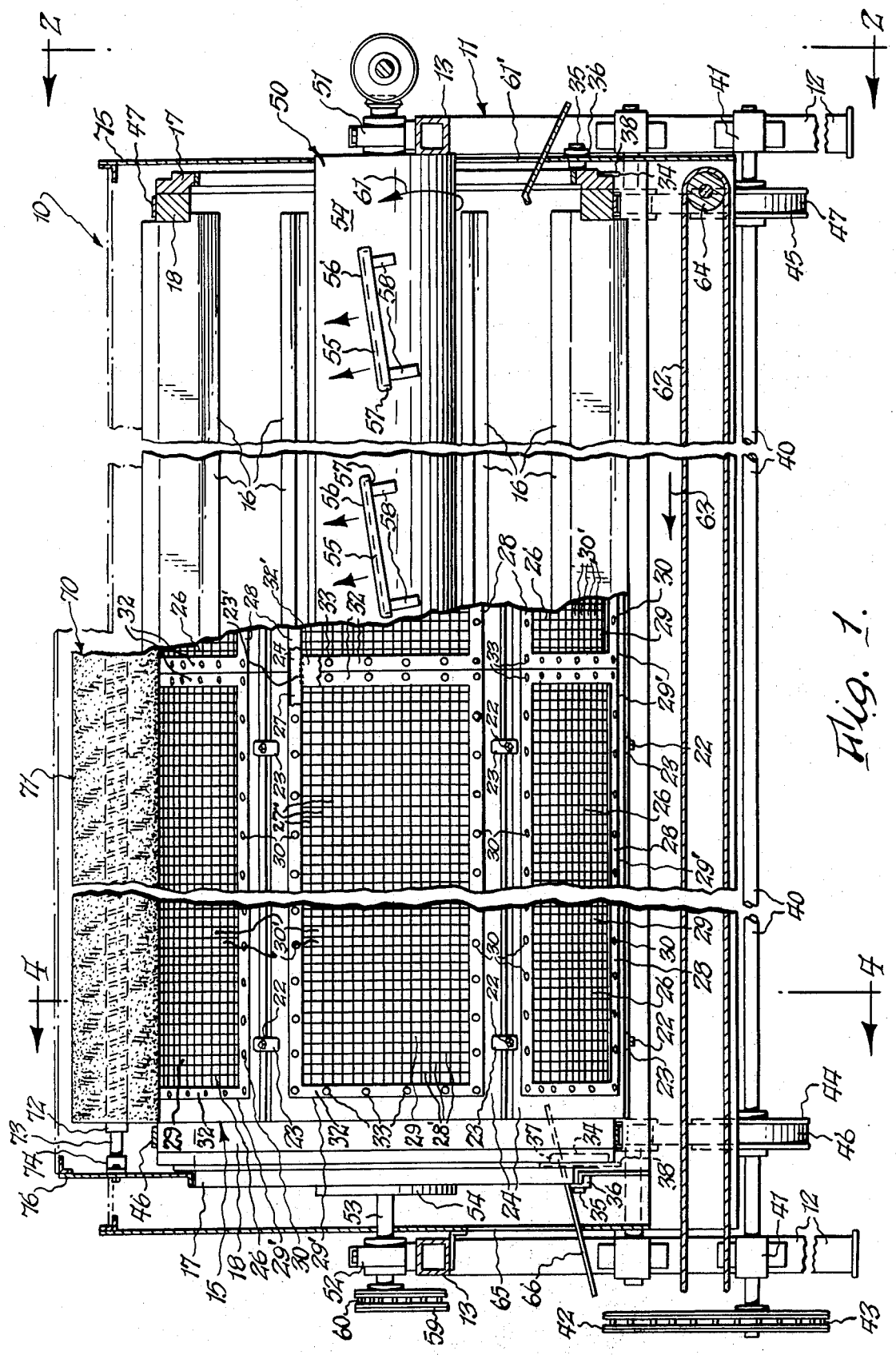

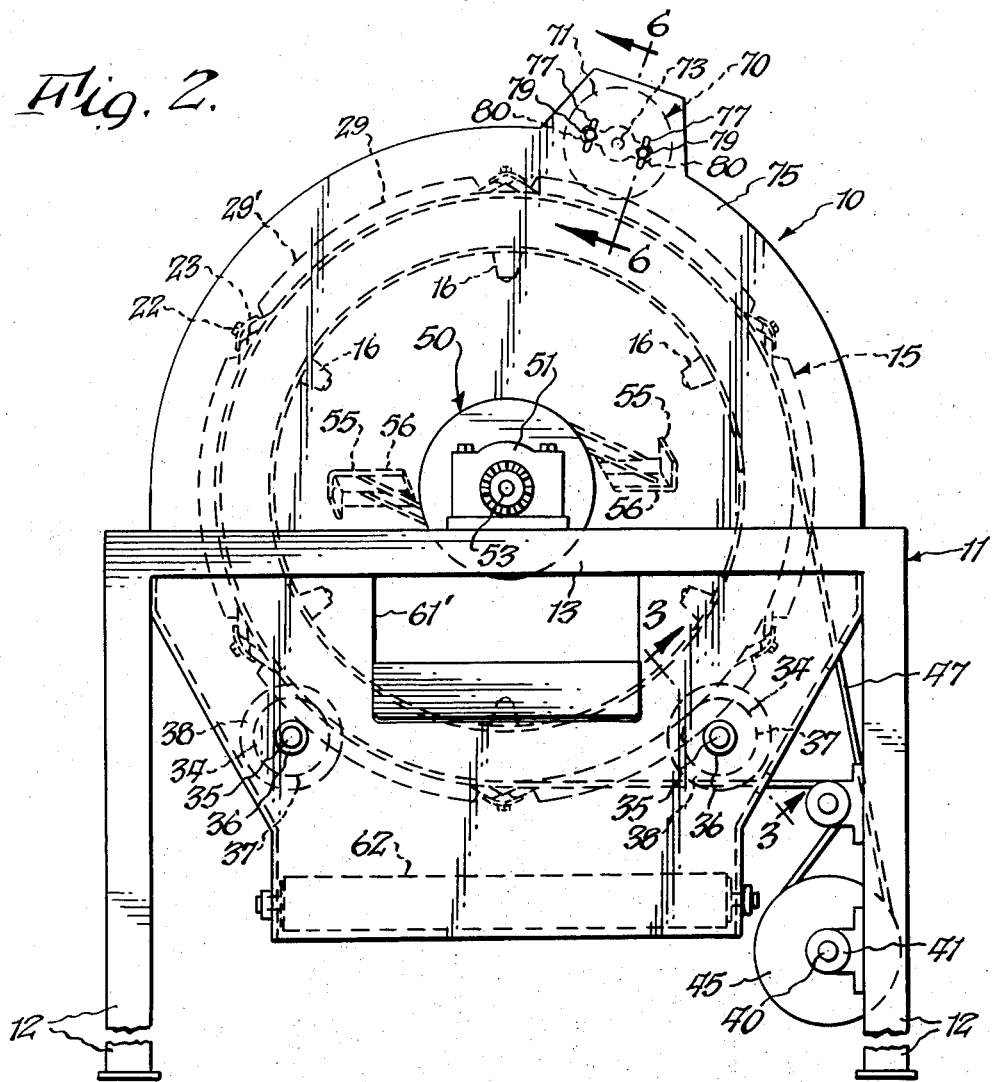

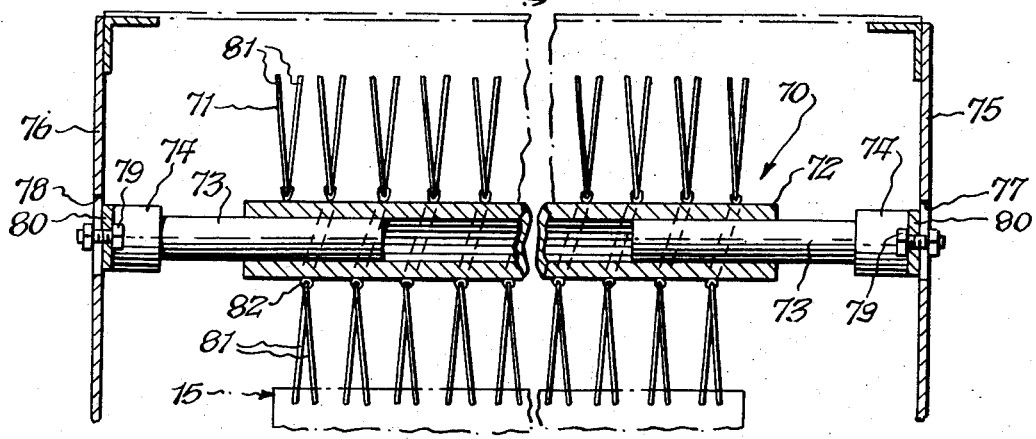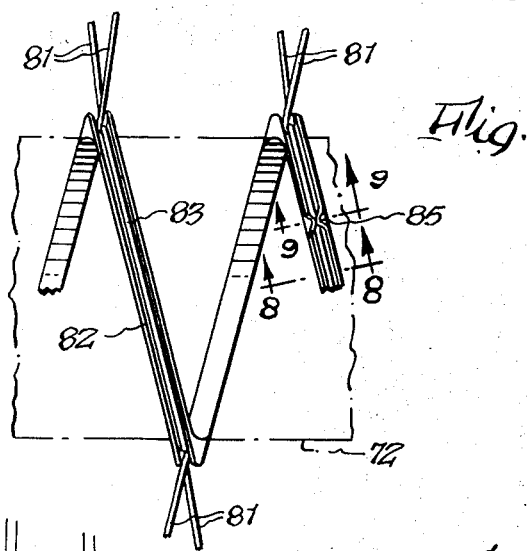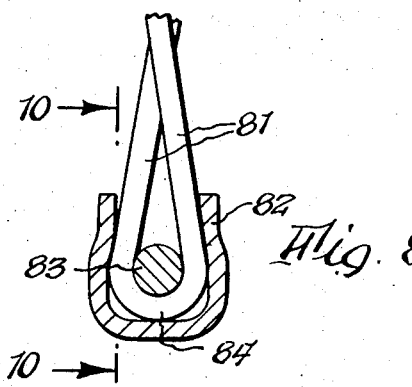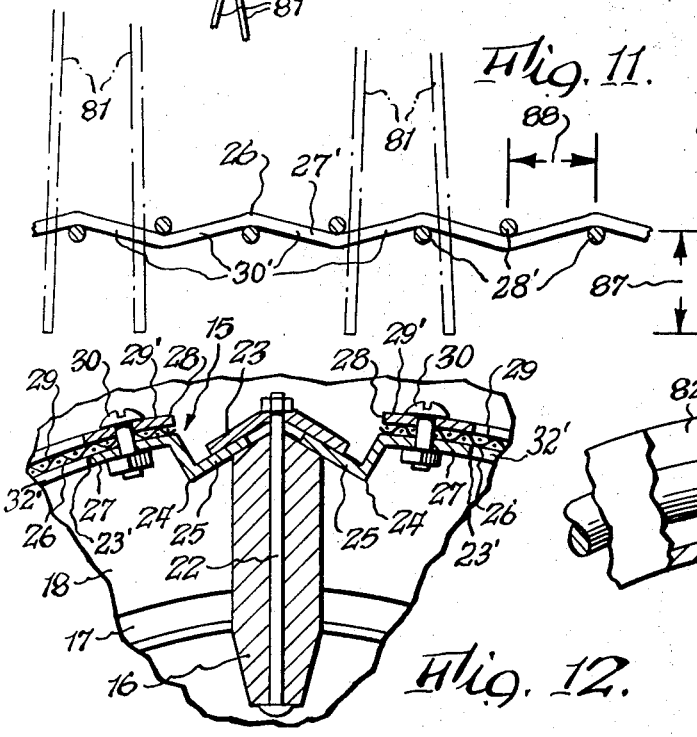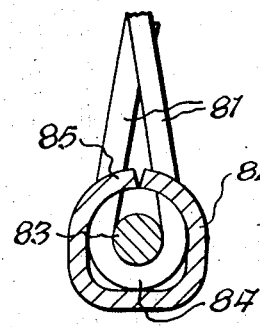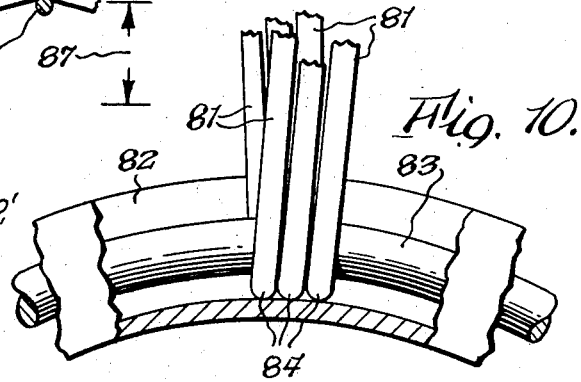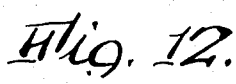

VINER

The present invention relates to a viner and more particularly to an improved construction for cleaning the reel thereof.

By way of background, there are in common use viners which remove peas from the vines on which they are grown. This type of viner includes a horizontally disposed hollow elongated tubular rotating reel having apertures in the surface thereof and a rotary beater construction arranged within the reel. The vines are fed into one end of the reel and the peas are removed from the vines by impact with the beater. The peas drop through apertures in the rotating reel onto a conveyor which transports them to a remote station. The debris consisting of the remainder of the plant, namely, the pods and the vines, are retained within the reel and fed out of the opposite end of the reel to a suitable conveyor.

In the past, the reels of viners of the foregoing general type became clogged by the debris so that the peas could not readily pass through the apertures in the reel. This not only slowed down the production of the viner but also caused the peas to become unnecessarily bruised by repeated contact with the beater. Prior reel cleaners for unclogging the apertures in the reel of the viner have been relatively unsuccessful. Certain reel cleaners which were devised were relatively ineffectual and others were unnecessarily complicated. In short, prior reel cleaners were not as satisfactory as desirable. It is with overcoming the foregoing deficiencies of prior viner reel cleaner constructions that the present invention is concerned.

It is accordingly the primary object of the present invention to provide an improved construction for unclogging the apertures in the reel of a viner, the construction being extremely simple, highly efficient and relatively economical to fabricate.

Another object of the present invention is to provide an improved reel cleaner which can be installed onto existing viners in the field without requiring extensive modifications of the viners. Other objects and attendant advantages of the present invention will readily be perceived hereafter.

The improved viner of the present invention comprises a frame, an elongated reel having a surface with apertures therein for permitting the crop to pass therethrough while retaining debris consisting of the remainder of the plant within said reel, means for mounting said reel for rotation about a generally horizontal axis, beater means within said reel for separating said crop from said remainder of said plant, and cleaner means for separating said debris from engagement with the inside of said surface of said reel, said cleaner means comprising elongated penetrating members, and means for selectively causing said penetrating members to be inserted inwardly through said apertures to force said debris away from obstructing relationship with said apertures. In its more specific aspect, the cleaner means comprises an elongated substantially cylindrical brush member having an axis located in substantially parallel relationship to the axis of said reel and lying outside of said reel, with said brush having bristles which engage the outside surface of said reel and penetrate said apertures to dislodge the said debris therefrom, said brush being journalled for idle rotation and being rotated by virtue of the bristles being in intermeshing engagement with said apertures.

The various aspects of the present invention will be more fully understood when the following portions of the specification are read in conjunction with the accompanying drawings wherein:

FIG. 1 is a fragmentary side elevational view of the improved viner of the present invention with portions broken away to show parts on the inside of the viner;

FIG. 2 is an end elevational view taken substantially in the direction of line 2—2 of FIG. 1 and showing the orientation of the various parts of the viner relative to each other;

FIG. 3 is a fragmentary view, partially in cross section, and taken substantially along line 3—3 of FIG. 2 showing the relationship between a portion of the reel and one of the supporting rollers therefor;

FIG. 6 is a fragmentary cross sectional view taken substantially along line 6—6 of FIG. 4 and showing the mounting details of the reel cleaning brush and also showing certain details of construction of the reel cleaning brush;

FIG. 7 is an enlarged constructional detail of the bristle supporting channel mounted on the core of the cleaning brush;

FIG. 8 is a cross sectional view taken substantially along line 8—8 of FIG. 7 and showing the relationship between the bristle channel, the bristles, and the wire for holding the bristles in position within the channel;

FIG. 9 is a cross sectional view taken substantially along line 9—9 of FIG. 7 and showing the manner in which the bristle channel is crimped to retain the bristle holding wire in position;

FIG. 10 is a fragmentary cross sectional view taken substantially along line 10—10 of FIG. 8 and showing the bristle holding channel generally in side elevation;

FIG. 11 is a schematic view showing the penetrating relationship between the ends of the bristles and the surface of the reel; and FIG. 12 is a fragmentary cross sectional view taken substantially along line 12—12 of FIG. 5 and showing the details for mounting the screens on the outside of the reel.

Figure 4:
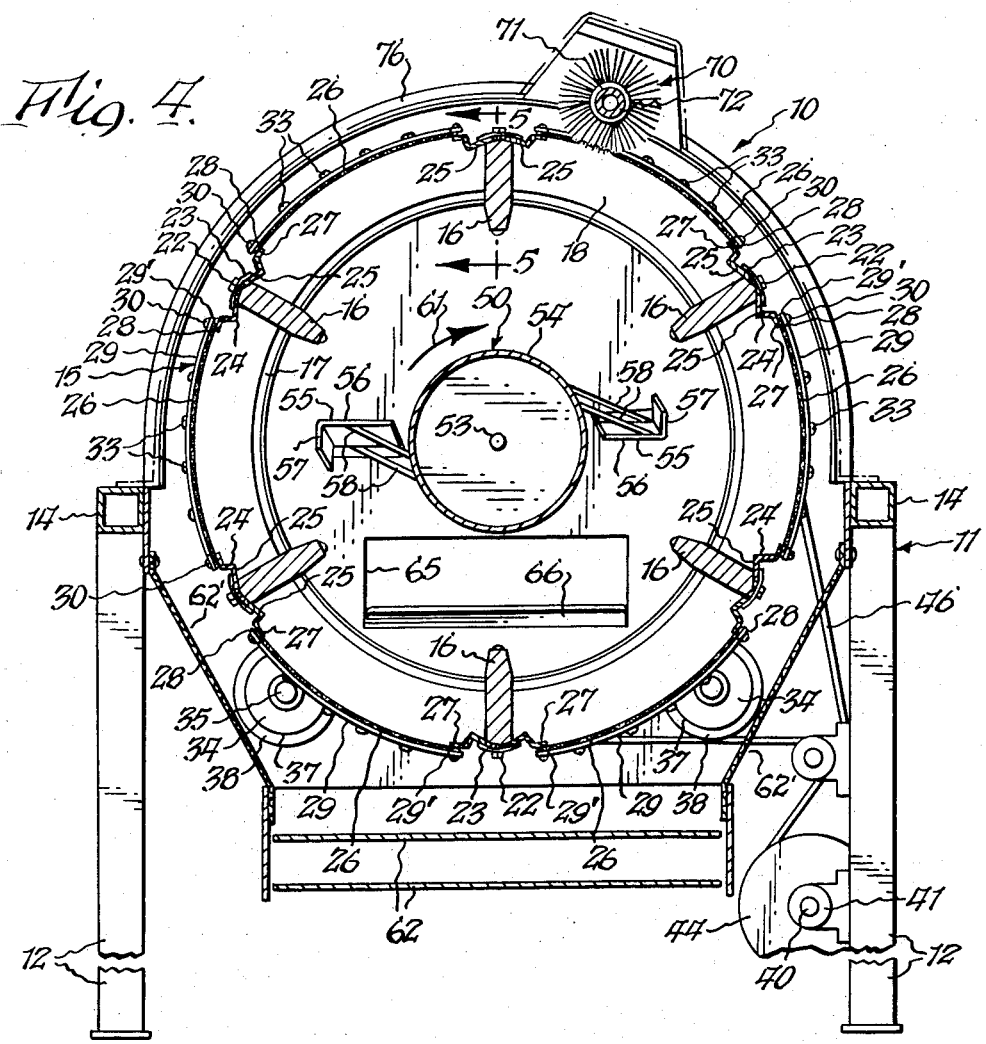
FIG. 4 is a cross sectional view taken substantially along line 4—4 of FIG. 1 and showing various details of construction of the viner including the reel and the cleaning brush therefor.
Figure 5:
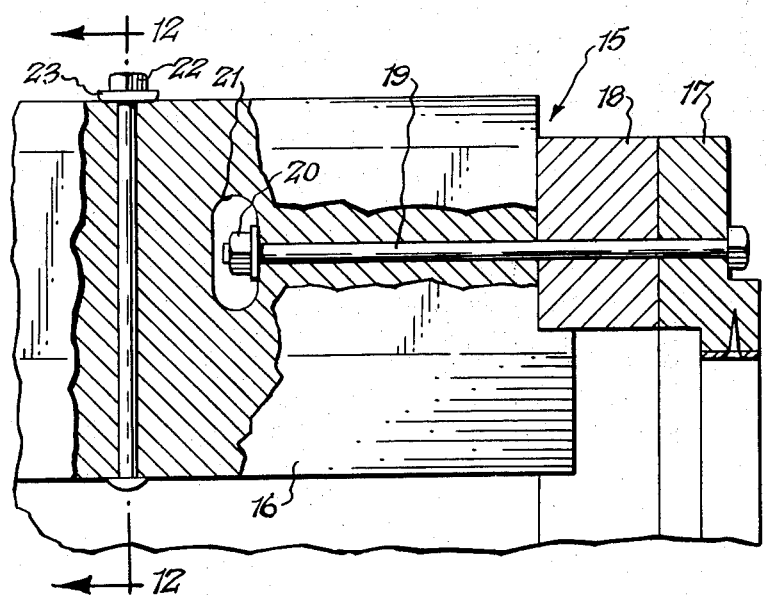
FIG. 5 is a fragmentary cross sectional view taken substantially along line 5—5 of FIG. 4 and showing the constructional details of the rib supporting portions of the reel.

The improved viner 10 includes a frame 11 having four spaced legs 12 of generally square tubular construction. The legs 12 at the ends of the viner are joined at their tops by cross members 13. The legs 12 at the sides of the viner are joined at their tops by longitudinal frame members 14 which are also of box-shaped cross section.

A hollow apertured reel 15, which is generally in the shape of a hollow cylinder, is mounted on frame 11 for rotation generally about its horizontally disposed longitudinal axis. More specifically, reel 15 includes longitudinally extending ribs 16 which extend substantially throughout the length of reel 15 in a direction generally parallel to its longitudinal axis. The ends of ribs 16 are secured to adjacent annular rings 17 and 18 at circumferentially spaced locations by bolts 19 which extend through rings 17 and 18 and through the end portions of ribs 16 and are retained in position by nuts 20 located in apertures 21 in ribs 16.

A plurality of arcuate screen units 29 are mounted on ribs 16 to define the outer surface of the reel. Screen units 29 permit the crop, such as peas, to pass therethrough while retaining the remainder of the plant, which constitutes debris, within the reel 15. Each screen unit includes a frame 29' and a screen 26 having crossing wires 27' and 28' defining apertures 30'. Each frame 29' includes longitudinal side edges 28 and end edges 32. Frame edges 28 are secured to angles 24 which run the entire length of the reel 15 in parallel relationship to ribs 16. Angles 24 include leg portions 25 which are held on ribs 16 by brackets 23 which are secured to ribs 16 by bolts 22. Angles 24 also include leg portions 27 on which the longitudinal edges 28 of screen units 29 rest and to which they are secured by bolts 30. The end edges 32 of frames 29' are secured by bolts 23 to the metal strips 32' which have their opposite ends secured to adjacent parallel angles 24, as by welding at 23'. Thus the edges of each screen 26 are held in position on legs 27 of channels 24 and on strips 32' by frames 29'. It can thus be seen that the reel 15 possesses a plurality of screen units 29 which are securely bolted to the remainder of the reel.

Reel 15 is supported for rotation by flanged rollers 34 (FIG. 3) which are mounted on shafts 35 journalled in bearings 36 suitably secured to the frame of the machine. Each flanged roller 34 includes a supporting section 37 on which annular rim 17 rests and a flanged portion 38 which prevents reel 15 from moving axially during operation. It will be appreciated that the two rollers 34 at one end prevent reel 15 from moving in one direction and the two supporting rollers 34 at the other end of the reel prevent it from moving in the opposite direction.

The reel 15 is driven by a belt drive. In this respect, a main drive shaft 40 has opposite end portions journalled in bearings 41 secured to spaced legs 12 of frame 11. A drive chain 42 is driven by a suitable power source (not shown) and encircles a pulley 43 keyed to the end of drive shaft 40. Reel driving pulleys 44 and 45 are keyed at spaced locations on shaft 40. A first belt 46 encircles pulley 44 and annular rim 18 at one end of reel 15 and a second belt 47 encircles pulley 45 and annular rim 18 at the opposite end of reel 15. It can thus be seen that whenever drive shaft 40 is in motion, reel 15 will rotate about its longitudinal axis. Reel 15 rotates in a clockwise direction when viewed from FIG. 4.

A beater assembly 50 is mounted centrally within reel 15. More specifically, a bearing 51 is secured to frame member 13 at one end of the viner and a bearing member 52 is mounted on frame member 13 on the other end of the viner. Bearings 51 and 52 journal stub shafts 53 on which is mounted a beater cylinder 54 which carries a plurality of beaters 55 thereon. Each of the beaters 55 is preferably in the form of a sheet metal plate having a face 56 and a reinforcing flange 57. Struts 58 rigidly secure beaters 55 to beater cylinder 50.

A drive including chain 59 driven from a suitable motor source (not shown) encircles pulley 60 keyed to the end of shaft 53 for driving beater assembly 50 in the direction of arrow 61 at a much greater speed than the speed of rotation of reel 15 which also rotates in the same direction. The beater plates 55 serve both to thresh the vines and also convey the vines through reel 50 and to this end the beaters are set at such an angle about the axis of beater cylinder 54 so as to obtain generally the desired rate of flow of the material through the viner.

In operation, the vines containing the pods with the peas therein are deposited into reel 15 through opening 61'. The vines will be lifted upwardly in a clockwise direction in FIG. 4 by ribs 16 until such time as they slide off and fall toward the beater drum 54 whereupon beater plates 55 will strike the mass and the impact will crack the pods to release the peas which will fall downwardly within reel 15 and fall through the apertures 30' in screens 26 and onto conveyor belt 62 which is driven in the direction of arrow 63 and the peas will be carried to a suitable area where they will be deposited. Side plates 62' prevent the peas from falling outside of the viner. Conveyor 62 is driven from a suitable source and encircles idler pulley 64 which is suitably journalled on the frame of the machine. The repeated lifting of the vines and dropping them into impacting relationship with beaters 55 will cause the peas to be substantially completely removed from the vines in the time that it takes for the vines to move from reel entrance 61 to reel exit 65 at the opposite end of the viner. The straw or debris remaining after the vining operation will be deposited onto plate 66 from which it drops to a suitable conveyor (not shown) which carries it to a disposal area.

In prior types of viners, the apertures 30' became clogged with debris from the plants and it was difficult to unclog the apertures which, in turn, prevented the peas from dropping through. This in turn not only impaired the efficiency of the viner, but also subjected the peas which were already shelled to unnecessary repeated beating. In accordance with the present invention a highly simplified and effective cleaner assembly 70 is provided in the nature of a bruch 71 which cyclically penetrates all of the screens 26 from the outside of the reel inwardly to unclog the apertures. The bristle brush 71 includes a cylindrical core member 72 mounted on stub shafts 73 which are journalled in bearings 74 secured to housing end walls 75 and 76. An adjusting structure is provided consisting of slots 77 in wall 75 and corresponding slots 78 in wall 76. Bolts 79 severally extend through ears 80 on opposite sides of bearing 74 and also extend through slots 77 and 78. It will be appreciated that after loosening bolts 79 the brush 71 can be moved bodily toward or away from reel 15 to adjust the amount of penetration of bristles 81 into screens 26. Upon the tightening of bolts 79 the brush 71 will be retained in its adjusted position.

The bristle brush 71 includes a channel 82 which is spirally wound about and secured to core member 72. A retaining wire 83 lies within channel 82 and bears down on the lower central portions 84 of the bristles 81. Channel 82 is crimped at spaced locations 85 to retain the wire 83 and bristles held thereby within channel 82. The crimped portions are spaced at approximately every 90° about the periphery of core member 72. As can be seen from FIG. 10, the bristles 81 are substantially adjacent to each other.

As noted above, shafts 73 are journalled for rotation in bearings 74 and the ends of bristles 81 are in meshing engagement with the adjacent apertures in screens 26. Therefore as reel 15 rotates, the ends of bristles 81 will penetrate the apertures 30' in screens 26 and the brush 71 will rotate idly. The ends of bristles 81 will enter the apertures in screens 26 without damage to the screens or to the bristles because the bristles are sufficiently flexible to slip into apertures 30'. However, the bristles 81 are sufficiently rigid to push debris away from the inside of screens 26. The ribs 16 are preferably radially set in to a certain extent from the outermost circumferential surface of the reel so as to avoid unnecessary flexing and wear on bristles 81. The bristles are preferably made of nylon filaments approximately .060 inches in diameter and they will penetrate screens 26 anywhere between 1/4 and 1/2 of an inch as depicted by dimension 87 in FIG. 11.

At this point it is to be noted that the diameter of brush 71 is approximately 11 inches and that the spacing between adjacent turns of channel 82 is between 1 and 2 inches. Furthermore, the mesh of screen 29 is such that the openings are approximately 1/2 inch square, as depicted by dimension 88 in FIG. 11. As can be seen from FIG. 11, the bristles 81 will penetrate the apertures 30' in the screens 26 in a random fashion and will unclog them by pushing debris away from the inner surfaces of the screens. It is to be noted from FIG. 11 that the bristles 81 are spaced so as to penetrate only certain of the apertures 30' which are proximate brush 72 at any given time and that other apertures 30' will be penetrated at a subsequent revolution of reel 15. This selective partial penetration has been found to be effective without creating objectionable drag on reel 15.

While the above description has referred specifically to peas, it will be appreciated that the applicable principles and structure of the present invention are equally capable of being used with other crops such as lima beans or any other type of plants which are threshed in a viner, and while a preferred embodiment of the present invention has been disclosed it will be appreciated it is not necessarily limited thereto but may be otherwise embodied within the scope of the following claims.

What is claimed is:

1. A viner for separating a crop from the remainder of the plant comprising a frame, an elongated hollow reel having a surface with apertures therein for permitting said crop to pass therethrough while retaining debris consisting of the remainder of said plant within said reel, means for mounting said reel for rotation about a generally horizontal axis, beater means within said reel for separating said crop from said remainder of said plant, and cleaner means for separating said debris from engagement with the inside of said surface of said reel, said cleaner means comprising elongated penetrating members, and mounting means for mounting said elongated penetrating members so as to selectively cause said penetrating members to be inserted inwardly through said apertures into the inside of said reel to force said debris away from obstructing relationship with said apertures.

2. A viner as set forth in claim 1 wherein said penetrating members comprise elongated bristles.

3. A viner as set forth in claim 2 wherein said bristles are flexible.

4. A viner as set forth in claim 3 wherein said surface of said reel is fabricated from screening and wherein said apertures are openings in said screening.

5. A viner as set forth in claim 2 wherein said cleaner means comprises an elongated generally cylindrical brush having a core and longitudinal axis, and wherein said mounting means includes means for rotatably mounting said brush with its longitudinal axis generally parallel to the axis of said reel, and wherein said mounting means also includes means for securing said core against radial movement away from said reel.

6. A viner as set forth in claim 5 wherein said means for rotatably mounting said brush comprise journal means for permitting said brush to rotate idly as a result of the meshing engagement between said bristles and said reel.

7. A viner as set forth in claim 6 wherein said bristles are flexible.

8. A viner as set forth in claim 7 wherein said apertures are at least about 1/2 inch square.

9. A viner as set forth in claim 8 wherein said bristles penetrate said apertures an amount of between about 1/4 and 1/2 inches.

10. A viner as set forth in claim 9 wherein said bristles are approximately about 1/16 inch in diameter.

11. A viner as set forth in claim 5 wherein said brush is located generally above said reel so as to permit dislodged debris to fall downwardly.

12. A viner as set forth in claim 7 wherein adjacent bristles are generally spaced apart in a direction axially of said drum a greater amount than said apertures in said drum.

* * * * *

Disclaimer 3,825,018.—*Dominic Ferraro*, Walla Walla, Wash. VINER. Patent dated July 23, 1974. Disclaimer filed May 13, 1976, by the assignee, *Chisholm-Ryder Company, Inc.*

Hereby enters this disclaimer to claims 1–4 of said patent.

[*Official Gazette July 6, 1976.*]